(12) United States Patent
Baek et al.

(10) Patent No.: US 9,634,497 B2
(45) Date of Patent: Apr. 25, 2017

(54) BATTERY CHARGING METHOD AND BATTERY MANAGEMENT SYSTEM THEREFOR

(71) Applicant: SAMSUNG SDI CO., LTD., Yongin-si, Gyeonggi-do (KR)

(72) Inventors: Ho-Yul Baek, Yongin-si (KR); Yoo-Hong Jang, Yongin-si (KR); Seung-Bum Suh, Yongin-si (KR); Kyeong-Beom Cheong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 14/711,642

(22) Filed: May 13, 2015

(65) Prior Publication Data
US 2015/0340885 A1 Nov. 26, 2015

(30) Foreign Application Priority Data

May 20, 2014 (KR) .......................... 10-2014-0060560

(51) Int. Cl.
*H02J 7/00* (2006.01)
*H02J 7/04* (2006.01)

(52) U.S. Cl.
CPC .......... *H02J 7/0013* (2013.01); *H02J 7/0073* (2013.01); *H02J 7/0077* (2013.01); *H02J 7/044* (2013.01)

(58) Field of Classification Search
CPC ...... H02J 7/0013; H02J 7/0073; H02J 7/0077; H02J 7/044

(Continued)

(56) References Cited

U.S. PATENT DOCUMENTS 3,886,428 A * 5/1975 Macharg ............... H02J 7/0086
320/156
4,105,962 A * 8/1978 Scott, Jr. ............... H02J 7/0091
320/153

(Continued)

FOREIGN PATENT DOCUMENTS

JP 2006284431 A * 10/2006
JP 2011-24412 A 2/2011

(Continued)

OTHER PUBLICATIONS

Alekseev et al., Russian Patent Document No. RU-2312432-C2, Published Dec. 10, 2007, 3 pages, English abstract.*

(Continued)

*Primary Examiner* — Phallaka Kik
(74) *Attorney, Agent, or Firm* — Lewis Roca Rothgerber Christie LLP (57) ABSTRACT

A battery charging method, including obtaining a voltage capacity ratio for a reference charge C-rate and voltage capacity ratios for N (N an integer of 1 or more) charge C-rates greater than the reference charge C-rate, each of the voltage capacity ratios for the reference charge C-rate and the N charge C-rates being defined as a ratio of a voltage variance to a capacity variance depending on a change in state of charge (SOC) of a battery when the battery is charged at a corresponding one of the C-rates, comparing the voltage capacity ratio of the reference charge C-rate with each of the voltage capacity ratios of the N charge C-rates, and then setting a charge C-rate of the N charge C-rates so that a difference in voltage capacity ratio is minimized for each of SOC sections, and charging the battery with the charge C-rates corresponding to the SOC sections.

20 Claims, 5 Drawing Sheets

(58) Field of Classification Search
USPC .......................................... 320/128, 135, 160
See application file for complete search history.

(56) References Cited

U.S. PATENT DOCUMENTS

| | | | | |
|---|---|---|---|---|
| 6,072,302 | A * | 6/2000 | Underwood | H02J 3/38 322/17 |
| 8,466,685 | B2 * | 6/2013 | Kirchev | G01R 31/3675 320/132 |
| 2005/0191528 | A1 * | 9/2005 | Cortes | H01M 10/4285 429/7 |
| 2006/0093894 | A1 | 5/2006 | Scott et al. | |
| 2006/0238167 | A1 * | 10/2006 | Arai | G01R 31/3693 320/132 |
| 2009/0123813 | A1 * | 5/2009 | Chiang | C01B 25/45 429/50 |
| 2011/0012563 | A1 | 1/2011 | Paryani et al. | |
| 2012/0169284 | A1 | 7/2012 | Park | |
| 2013/0027047 | A1 | 1/2013 | Yoshioka et al. | |
| 2013/0166233 | A1 | 6/2013 | Suh et al. | |
| 2013/0293020 | A1 * | 11/2013 | Shim | H02J 7/34 307/72 |
| 2013/0307488 | A1 | 11/2013 | Hwang | |
| 2014/0028267 | A1 * | 1/2014 | Lee | H02J 7/0052 320/152 |
| 2015/0280489 | A1 * | 10/2015 | Curlett | H05B 37/0218 307/66 |

FOREIGN PATENT DOCUMENTS

| | | | |
|---|---|---|---|
| JP | 2011188700 | A * | 9/2011 |
| JP | 2011215125 | A * | 10/2011 |
| KR | 10-2012-0078842 | A | 7/2012 |
| KR | 10-2013-0127792 | A | 11/2012 |
| KR | 10-2012-0139818 | A | 12/2012 |
| KR | 10-2013-0073802 | A | 7/2013 |
| KR | 10-2013-0080518 | A | 7/2013 |

OTHER PUBLICATIONS

EPO Search Report dated Oct. 1, 2015, for corresponding European Patent application 15168490.9, (5 pages).

* cited by examiner

BATTERY CHARGING METHOD AND BATTERY MANAGEMENT SYSTEM THEREFOR

CROSS-REFERENCE TO RELATED APPLICATION

This application claims priority to and the benefit of Korean Patent Application No. 10-2014-0060560, filed on May 20, 2014, in the Korean Intellectual Property Office, the entire content of which is incorporated herein by reference.

BACKGROUND

1. Field

The present invention relates to a battery charging method and a battery management system therefor.

2. Description of the Related Art

Recently, as technology for portable devices, such as portable computers, mobile phones or cameras, is developed and demand for the portable devices is increased, demand for secondary batteries as an energy source is also increasing rapidly.

Because the secondary battery is rechargeable, it may be continuously used by recharging even though the battery has been discharged. Thus, the secondary battery varies in performance depending on the state of charge. Therefore, efforts have been made to improve the charging method and thereby enhance the performance of the secondary battery.

Figure 1:
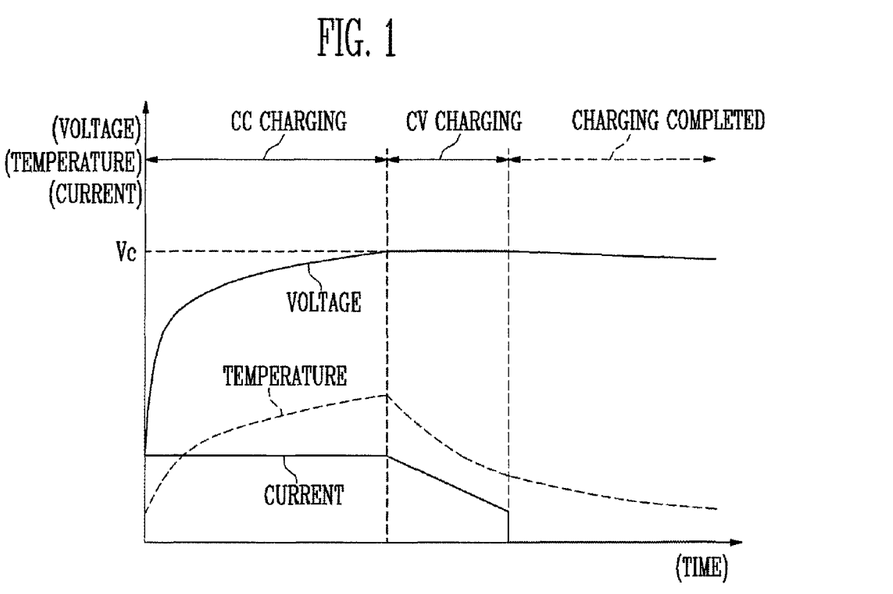
FIG. 1 is a view showing a constant current/constant voltage (CCCV) charging method that is one of the comparable secondary-battery charging methods.

FIG. 1 is a diagram showing a constant current/constant voltage charging method (hereinafter, referred to as a CCCV method), which is one of the comparable methods of charging the secondary battery. FIG. 1 shows changes in voltage and temperature when a charging operation is performed under the control of current as shown in the drawing. At an initial charging stage, first, constant current (CC) charging is performed. That is, assuming that a current value of the battery, which requires one hour to change from a full charge state to a discharge state, is 1 C-rate, charging is performed with the constant current of about 0.5 C-rate, for example. Until the voltage is increased by the charging operation to reach a preset voltage Vc, e.g. 4.2V, the CC charging is continued. When the voltage reaches the preset voltage Vc, the charging operation is switched to constant voltage (CV) charging. Thereby, the charging operation is performed while a charging current is reduced, so as to maintain the preset voltage Vc.

In order to achieve fast charging in the CCCV charging method, the C-rate of the CC charging should be set to a large value. However, the higher the C-rate is, the greater the heat dissipation and the rate of degradation of the secondary battery may be. Consequently, the output and capacity of the secondary battery may be undesirably reduced.

SUMMARY

Accordingly, the present invention has been made keeping in mind the above problems occurring in the related art, and an aspect of one or more embodiments of the present invention is to provide a battery charging method and a battery management system therefor, which are capable of reducing or preventing the degradation of a battery and enabling the fast charging of the battery.

Other aspects and features of the present invention will become apparent from the following description of embodiments.

According to an embodiment of the present invention, there is provided a battery charging method, including: obtaining a voltage capacity ratio for a reference charge C-rate and voltage capacity ratios for N (N is an integer of 1 or more) charge C-rates greater than the reference charge C-rate, each of the voltage capacity ratios for the reference charge C-rate and the N charge C-rates being defined as a ratio of a voltage variance to a capacity variance depending on a change in state of charge (SOC) of a battery when the battery is charged at a corresponding one of the C-rates; comparing the voltage capacity ratio of the reference charge C-rate with each of the voltage capacity ratios of the N charge C-rates, and then setting a charge C-rate of the N charge C-rates so that a difference in voltage capacity ratio is minimized for each of SOC sections; and charging the battery with the charge C-rates corresponding to the SOC sections.

In an embodiment, the obtaining the voltage capacity ratios includes: charging the battery with the reference charge C-rate, and then obtaining the voltage capacity ratio for the reference charge C-rate; and discharging the battery and then charging the battery with a first charge C-rate greater than the C-rate of a previous charging act by a preset value, thus obtaining a corresponding one of the voltage capacity ratios for the first charge C-rate, wherein the discharging and then charging of the battery is repeated N times so as to obtain the voltage capacity ratios for the first charge C-rate to an Nth charge C-rate.

In an embodiment, the discharging of battery is performed by constant current-constant voltage (CCCV) discharging.

In an embodiment, the comparing the voltage capacity ratio includes: selecting an SOC section in which a difference in voltage capacity ratio between the reference charge C-rate and the Nth charge C-rate is within a preset range, for all SOC sections of the battery, and then setting a charge C-rate of the selected SOC section to the Nth charge C-rate; and selecting an SOC section in which a difference in voltage capacity ratio between the reference charge C-rate and an (N−1)th charge C-rate is within a preset range, for SOC sections other than the selected SOC section, and then setting a charge C-rate of the selected SOC section to the (N−1)th charge C-rate, wherein selecting the SOC section is repeatedly performed for an (N−2)th charge C-rate to the first charge C-rate in substantially a same manner.

In an embodiment, a charge C-rate of a section of the SOC sections in which any one of the N charge C-rates is not set, is set to the reference charge C-rate.

In an embodiment, during the charging the battery, constant current (CC) charging or constant current-constant voltage (CCCV) charging is performed in each of the SOC sections using a corresponding one of the charge C-rates.

In an embodiment, when the battery charging is performed by the CC charging, a first SOC section of the SOC sections is supplied with a corresponding one of the charge C-rates and then is charged until a voltage of the battery reaches a charge cutoff voltage set for the first SOC section.

In an embodiment, when the battery is charged at the charge C-rate corresponding to the first SOC section, a charge cutoff voltage set for the first SOC section is a voltage at which the SOC of the battery becomes a final SOC of the first SOC section.

In an embodiment, when the battery charging is performed by the CCCV charging, a first SOC section of the SOC sections undergoes the CC charging by supplying the corresponding one of the charge C-rates until the voltage of the battery becomes a charge cutoff voltage set for the first SOC section, and undergoes constant voltage (CV) charging by supplying a charge C-rate that is sequentially reduced until the SOC of the battery becomes a final SOC of the first SOC section.

In an embodiment, the charge cutoff voltage set for the first SOC section is a voltage at which the SOC of the battery becomes the final SOC of the first SOC section, when the battery is charged at a C-rate set for a second SOC section that is a section subsequent to the first SOC section.

In an embodiment, the charge C-rate that is sequentially reduced is reduced to the charge C-rate set for the SOC section that is subsequent to the first SOC section.

In an embodiment, when a number of battery charging and discharging operations reaches a preset number, the obtaining the voltage capacity ratios and comparing the voltage capacity ratio are performed again to reset the charge C-rates corresponding to the SOC sections.

According to an embodiment of the present invention, there is provided a battery management system, including: a voltage-capacity-ratio acquisition unit configured to obtain a voltage capacity ratio for a reference charge C-rate and voltage capacity ratios for N (N is an integer of 1 or more) charge C-rates greater than the reference charge C-rate, each of the voltage capacity ratios for the reference charge C-rate and the N charge C-rates being defined as a ratio of a voltage variance to a capacity variance depending on a change in SOC of a battery when the battery is charged at a corresponding one of the C-rates; a charge-current setting unit configured to compare the voltage capacity ratio of the reference charge C-rate with each of the voltage capacity ratios of the N charge C-rates, and then setting a charge C-rate of the N charge C-rates so that a difference in voltage capacity ratio is minimized for each of SOC sections; and a micro control unit (MCU) configured to control charging of the battery such that the battery is charged at the charge C-rates corresponding to the SOC sections.

In an embodiment, the battery management system further includes: a sensing unit configured to sense a voltage and a current of the battery, wherein the voltage-capacity-ratio acquisition unit obtains a corresponding one of the voltage capacity ratios of any one of the charge C-rates using the voltage and the current that are sensed by the sensing unit, when the battery is charged using any one of the reference charge C-rate and the N charge C-rates.

In an embodiment, the MCU is configured to perform CC charging or CCCV charging for each of the SOC sections, using a corresponding one of the charge C-rates.

In an embodiment, when the battery charging is performed by the CC charging, a first SOC section of the SOC sections undergoes the CC charging by supplying a corresponding one of the charge C-rates until a voltage of the battery becomes a charge cutoff voltage set for the first SOC section.

In an embodiment, when the battery is charged at the charge C-rate corresponding to the first SOC section, the charge cutoff voltage set for the first SOC section is a voltage at which the SOC of the battery becomes a final SOC of the first SOC section.

In an embodiment, when the battery charging is performed by the CCCV charging, a first SOC section of the SOC sections undergoes the CC charging by supplying the corresponding one of the charge C-rates until the voltage of the battery becomes a charge cutoff voltage set for the first SOC section, and undergoes the CV charging by supplying the charge C-rate that is sequentially reduced until the SOC of the battery becomes a final SOC of the first SOC section.

In an embodiment, the charge cutoff voltage set for the first SOC section is a voltage at which the SOC of the battery becomes the final SOC of the first SOC section, when the battery is charged at a C-rate set for a second SOC section that is a section subsequent to the first SOC section.

In an embodiment, the charge C-rate that is reduced, is reduced to the charge C-rate set for the SOC section that is subsequent to a first SOC section of the SOC sections.

As is apparent from the above description, the present invention is similar in degradation of the battery to conventional slow charging while reducing the charging time of the battery.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the figures, dimensions may be exaggerated for clarity of illustration. Like reference numerals refer to like elements throughout.

DETAILED DESCRIPTION

Some example embodiments of the present invention will be described below in detail with reference to the accompanying drawings.

The above and other aspects and features of the present invention will be described more fully hereinafter with reference to the accompanying drawings, in which example embodiments of the present inventions are shown. While some example embodiments of the present invention have been described using specific terms, such description is for illustrative purposes, and it is to be understood that changes and variances may be made without departing from the spirit or scope of the following claims. Further, it should be understood that parts, which are not essential to a complete understanding of the present invention, may be omitted in the drawings for clarity of description. Like reference numerals are used to identify like elements throughout different drawings.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §112, first paragraph, and 35 U.S.C. §132(a).

The battery management system and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the battery management system may be formed on one integrated circuit (IC) chip or on separate IC chips. Further, the various components of the battery management system may be implemented on a flexible printed circuit film, a tape carrier package (TCP), a printed circuit board (PCB), or formed on a same substrate as the battery management system. Further, the various components of the battery management system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The present invention relates to a battery charging method and a battery management system therefor, which are capable of reducing or minimizing the degradation of a battery, namely, the reduction in capacity and output of the battery, and of performing the fast charging of the battery.

According to embodiments of the present invention, in order to find conditions suitable for fast charging, a ratio of a voltage variance to a capacity variance, namely, a voltage/capacity ratio, depending on a change in the state of charge (SOC), is obtained for a plurality of C-rates. The voltage capacity ratio for a reference charge C-rate serving as the reference of slow charging is compared with voltage capacity ratios of the plurality of C-rates that are greater than the reference charge C-rate. Charge C-rates are set to reduce or minimize a difference in voltage capacity ratio for each of the SOC sections. Then, the battery is charged at the charge C-rate that is set for each SOC section. Therefore, it is possible to maintain the performance that is similar to performance of slow charging, and additionally, to reduce the charging time.

Hereinafter, the present invention will be described in detail with reference to the accompanying drawings.

Figure 2:
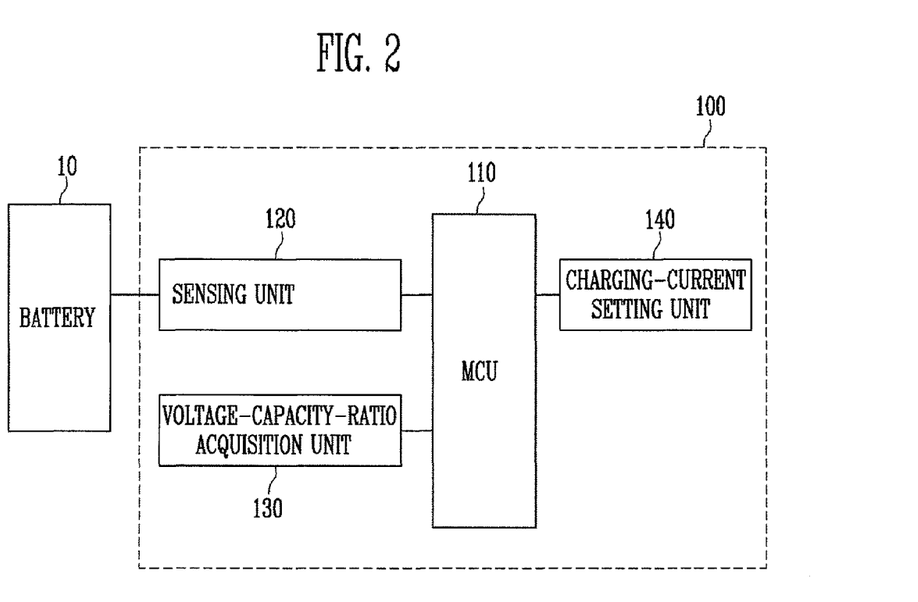
FIG. 2 is a block diagram showing the configuration of a battery management system according to an embodiment of the present invention.

FIG. 2 is a block diagram showing the configuration of a battery management system 100 according to an embodiment of the present invention.

Referring to FIG. 2, the battery management system 100 may include a micro control unit (MCU) 110, a sensing unit 120, a voltage-capacity-ratio acquisition unit 130, and a charge-current setting unit 140.

The MCU 110 serves to manage and control the entire charging and discharging of the battery 10.

The sensing unit 120 measures the output current and voltage of the battery 10 using a current sensor and a voltage sensor.

The voltage-capacity-ratio acquisition unit 130 obtains voltage capacity ratios of the reference charge C-rate for the slow charging and N (N is an integer of 1 or more) charge C-rates, which are greater than the reference charge C-rate.

Here, the C-rate refers to a current rate, which is a unit for setting a current value and predicting or marking the available time of the battery under various conditions when the battery is charged or discharged. The current value depending on the C-rate is calculated by dividing the charging or discharging current by the rated capacity of the battery. The C-rate uses C in unit, and satisfies the following Equation 1.

$$C\text{-rate} = \text{charging and discharging current/rated capacity of battery} \qquad \text{Equation 1}$$

The voltage capacity ratio for the charge C-rate may be defined as a value that is obtained by dividing a voltage variance depending on a change in state of charge (SOC) by a capacity variance depending on the change in SOC, and may be expressed as the following Equation 2.

$$\text{voltage capacity ratio} = dV/dQ \qquad \text{Equation 2}$$

where dV denotes the voltage variance depending on the change in SOC, and dQ denotes the variance of capacity depending on the change in SOC.

The voltage-capacity-ratio acquisition unit 130 charges the battery with the reference charge C-rate for the slow charging, and then obtains the voltage capacity ratio for the reference charge C-rate. Here, the voltage-capacity-ratio acquisition unit 130 may obtain the voltage capacity ratio using a voltage and a current that are input from the sensing unit 120 while the battery is charged at the reference charge C-rate.

Subsequently, after the battery is discharged, the battery is charged at a first charge C-rate that is increased to be greater than the charge C-rate of a previous charging step by a preset value, thus obtaining the voltage capacity ratio for the first charge C-rate.

Thereafter, while the charging process is repeated with the discharge and charge C-rate increased, it is possible to obtain the voltage capacity ratio for each of preset N charge C-rates. Thus, among the N charge C-rates, a first charge C-rate is the smallest value and an Nth charge C-rate is the greatest value.

Here, the discharging of the battery may be performed by the constant current/constant voltage (hereinafter, referred to as CCCV) discharging. The reason is as follows: when the discharge C-rate increases as the constant current (hereinafter, referred to as CC) discharging is performed, the battery rapidly reaches a cutoff voltage due to an increase in overvoltage, which leads to a reduction in discharge capacity.

Because the voltage capacity ratios of the charge C-rates are based on the electrochemical properties of substances, a change in voltage capacity ratio refers to a change in properties of substances. That is, it may be assumed that, when the voltage capacity ratios for the different charge C-rates are similar to each other, the properties of the substances are likewise similar to each other. Thus, when the SOC is divided into a number of sections using similarity in voltage capacity ratio between the reference charge C-rate for the slow charging and the N charge C-rates for the fast charging, and then the charge C-rate for the fast charging is set for each section, it is possible to perform the fast charging while undergoing degradation similar to that of the slow charging.

Figure 3:
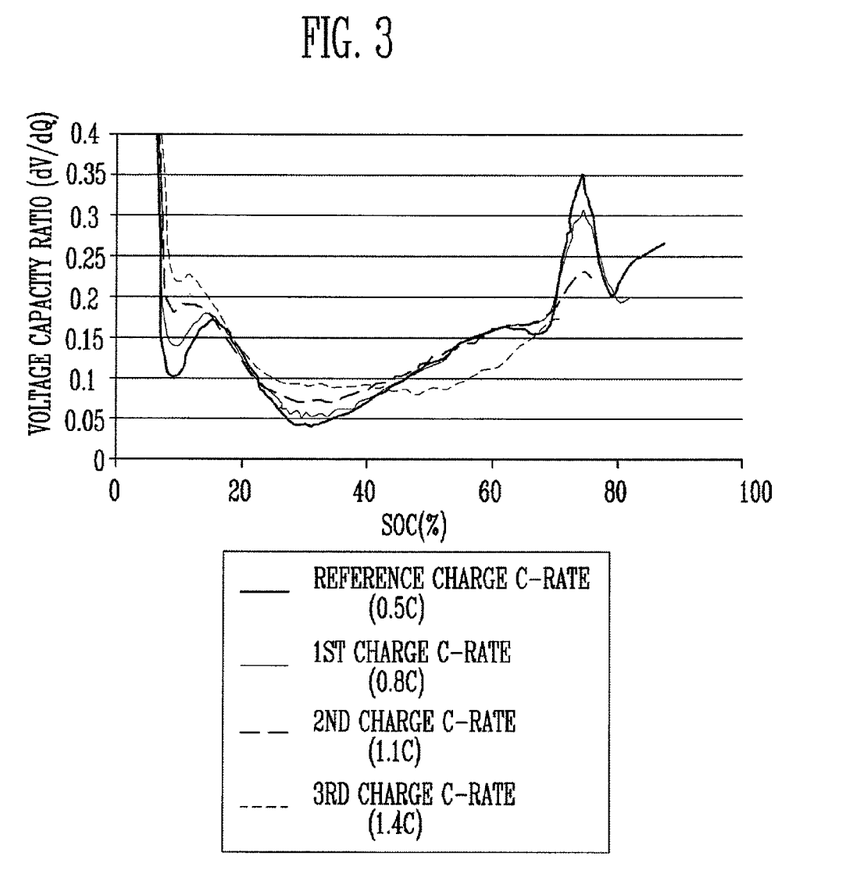
FIG. 3 is a diagram showing voltage capacity ratios for a plurality of C-rates according to an embodiment of the present invention.

FIG. 3 is a diagram showing voltage capacity ratios corresponding to a plurality of C-rates according to an embodiment of the present invention.

In FIG. 3, an X-axis designates an SOC %, while a Y-axis designates a voltage capacity ratio. FIG. 3 shows the voltage capacity ratios for the reference charge C-rate (about 0.5 C), the first charge C-rate (about 0.8 C), the second charge C-rate (about 1.1 C), and the third charge C-rate (about 1.4 C).

Referring to FIG. 3, it can be seen that the first and second charge rates are similar in voltage capacity ratio to the reference charge C-rate in a section where the SOC is about 15% to about 70%, and the first charge C-rate is similar in voltage capacity ratio to the reference charge C-rate in a section where the SOC is about 70% to about 80%.

FIG. 3 represents the voltage capacity ratio for the reference charge C-rate, until the SOC reaches about 90%. The reason is as follows: after the SOC of the battery 10 has reached about 90%, the CV charging is performed and thus the variance in voltage becomes substantially zero.

In order to set the charge C-rate for each SOC section, the charge-current setting unit 140 compares the voltage capacity ratio of the reference charge C-rate with the voltage capacity ratios of the N charge C-rates, and then the charge C-rate for reducing or minimizing a difference in voltage capacity ratio for each SOC section is set from among the N charge C-rates.

In an embodiment, the charge-current setting unit 140 first selects an SOC section where a difference between the voltage capacity ratio of the reference charge C-rate and the voltage capacity ratio of the Nth charge C-rate having the greatest value in the N charge C-rates is within a range (e.g., a preset range), among the entire SOC sections of the battery, and then set the charge C-rate of the selected SOC section to the Nth charge rate, at step S10. In this context, the range (e.g., the preset range) is a value that may be set by a user in view of the characteristics of the battery.

Subsequently, among SOC sections other than the selected SOC section, the SOC section where a difference between the voltage capacity ratio of the reference charge C-rate and the voltage capacity ratio of an (N−1)th charge C-rate is within a preset range is selected and the charge C-rate of the selected SOC section is set to the (N−1)th charge C-rate, at step S20.

The charge-current setting unit 140 may repeatedly perform the step S20 for the (N−2)th charge C-rate to the first charge C-rate in the same or substantially the same manner, at step S30.

The above-mentioned process is performed as follows: the voltage capacity ratio of the Nth charge C-rate that is greatest among the N charge C-rates and the voltage capacity ratio of the reference charge C-rate are first compared with each other, and then the voltage capacity ratios of the charge C-rates, which are sequentially reduced, are compared with the voltage capacity ratio of the reference charge C-rate. When there are a plurality of charge C-rates, having a difference in voltage capacity ratio within a preset range, in a specific SOC section, this is intended to set the greatest charge C-rate for fast charging to the charge C-rate of the specific SOC section.

Further, the charge-current setting unit 140 may set the charge C-rate of the SOC section where the charge C-rate is not set through the above-mentioned process, to the reference charge C-rate.

Hereinafter, steps S10 to S30 will be described with reference to FIG. 3.

Referring to FIG. 3, first, the charge-current setting unit 140 determines whether or not there is present an SOC section where a difference between the voltage capacity ratio of the reference charge C-rate and the voltage capacity ratio of the third charge C-rate is within a preset range. In this example, it is assumed that FIG. 3 has no SOC section where the difference between the voltage capacity ratio of the reference charge C-rate and the voltage capacity ratio of the third charge C-rate is within the preset range.

Next, the charge-current setting unit 140 determines whether or not there is present the SOC section where the difference in voltage capacity ratio between the reference charge C-rate and the second charge C-rate is within the preset range. In FIG. 3, it is assumed that the section where the SOC is about 15% to about 70% is determined as the SOC section, which is within the preset range. In this case, the charge-current setting unit 140 may set the charge C rate of the section where the SOC is about 15% to about 70%, to about 1.1 C.

In the initial section of FIG. 3 where the SOC is about 0% to about 15%, it may be seen that the voltage capacity ratio changes rapidly. This is due to an increase in overvoltage as the charge C-rate is applied to the battery 10. Thus, the charge C-rate of the initial section may be set not by comparing the voltage capacity ratios of the charge C-rates with each other but by using the charge C-rate, which is set for the SOC section subsequent to the initial section. In other words, the charge C-rate of the initial section where the SOC is about 0% to about 15% may be set to about 1.1 C.

Next, the charge-current setting unit 140 determines whether or not there is present the SOC section where the difference in voltage capacity ratio between the reference charge C-rate and the first charge C-rate is within the preset range, among the SOC sections other than the section where the SOC is about 15% to about 70%. In FIG. 3, it is assumed that the SOC section ranging from about 70% to about 80% is determined as the SOC section, which is within a preset range. In this case, the charge-current setting unit 140 may set, the charge C-rate of the SOC section ranging from about 70% to about 80%, to about 0.8 C.

The charge-current setting unit 140 may set the charge C-rate of the section where the charge C-rate is not set through the above-mentioned process, to the reference charge C-rate.

As such, the C-rate, which is set for each SOC section by the charge-current setting unit 140, may be represented as in the following Table 1.

TABLE 1

| SOC [%] | CHARGE C-RATE |
|---|---|
| 0 to 15 | 1.1 C |
| 15 to 70 | 1.1 C |
| 70 to 80 | 0.8 C |
| 80 to 90 | 0.5 C |

As shown in Table 1, the MCU 110 performs control operations such that the battery 10 is charged at the charge C-rate that is set for each SOC section.

The MCU 110 may perform the constant current (CC) charging or the CCCV charging for each SOC section.

If the charging of the battery 10 is performed by the CC charging, the first SOC section, which is any one of the SOC sections, may be charged by supplying the set charge C-rate to the first SOC section until the voltage of the battery 10 becomes the charge cutoff voltage, which is set for the first SOC section.

Here, when the battery 10 is charged at the charge C-rate that is set for the first SOC section, the charge cutoff voltage set for the first SOC section may be a voltage when the SOC of the battery 10 becomes a final SOC of the first SOC section.

Figure 4:
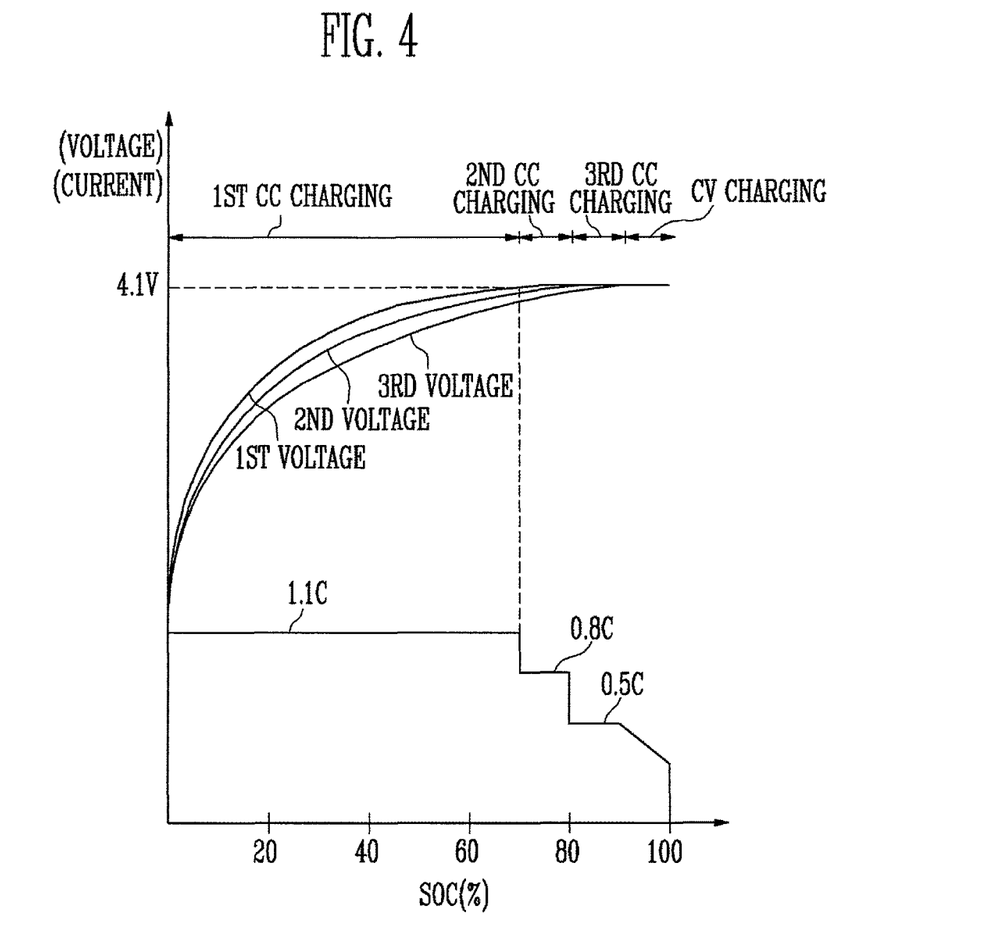
FIG. 4 is a diagram showing a method in which constant current (CC) charging is performed in each state of charge (SOC) section according to an embodiment of the present invention.

FIG. 4 is a diagram showing a method in which the CC charging is performed in each SOC section according to an embodiment of the present invention.

Referring to FIG. 4, in the first CC charging section where the SOC is about 0% to about 70%, the battery is charged at about 1.1 C. In the second CC charging section where the SOC is about 70% to about 80%, the battery is charged at about 0.7 C. In the third CC charging section where the SOC is about 80% to about 90%, the battery is charged at about 0.5 C.

In FIG. 4, a first voltage curve shows a change in voltage when the battery is charged at about 1.1 C, a second voltage curve shows a change in voltage when the battery is charged at about 0.8 C, and a third voltage curve shows a change in voltage when the battery is charged at about 0.5 C.

Referring to FIG. 4, the charge cutoff voltage in the section where the SOC is about 0% to about 70% may be about 4.1V, namely, the voltage of the battery when the SOC of the battery 10 in the first voltage curve reaches about 70%, which is the final SOC of the first CC charging section.

That is, the charge C-rate of about 1.1 C is supplied to the battery 10 in the SOC section ranging from about 0% to about 70% until the voltage of the battery 10 reaches the charge cutoff voltage, so that the first CC charging is performed. Subsequently, in the next section, namely, the SOC section ranging from about 70% to about 80%, the charge C-rate of about 0.8 C is supplied to the battery 10, so that the second CC charging is performed.

If the charging of the battery 10 is performed by the CCCV charging, the CC charging is performed in the first SOC section (which is one of the SOC sections) by supplying the charge C-rate, set for the first SOC section, to the battery 10 until the voltage of the battery becomes the charge cutoff voltage set for the first SOC section. Then, the sequentially reduced charge C-rate is supplied to the battery 10 until the SOC of the battery becomes the final SOC of the first SOC section, so that the CV charging is performed.

Here, when the battery 10 is charged at the charge C-rate that is set for the second SOC section, namely, the section subsequent to the first SOC section, the charge cutoff voltage set for the first SOC section may be a voltage when the SOC of the battery 10 becomes the final SOC of the first SOC section.

Further, according to an embodiment of the present invention, the sequentially reduced charge C-rate may be reduced to a charge C-rate, which is set for the SOC section subsequent to the first SOC section.

Figure 5:
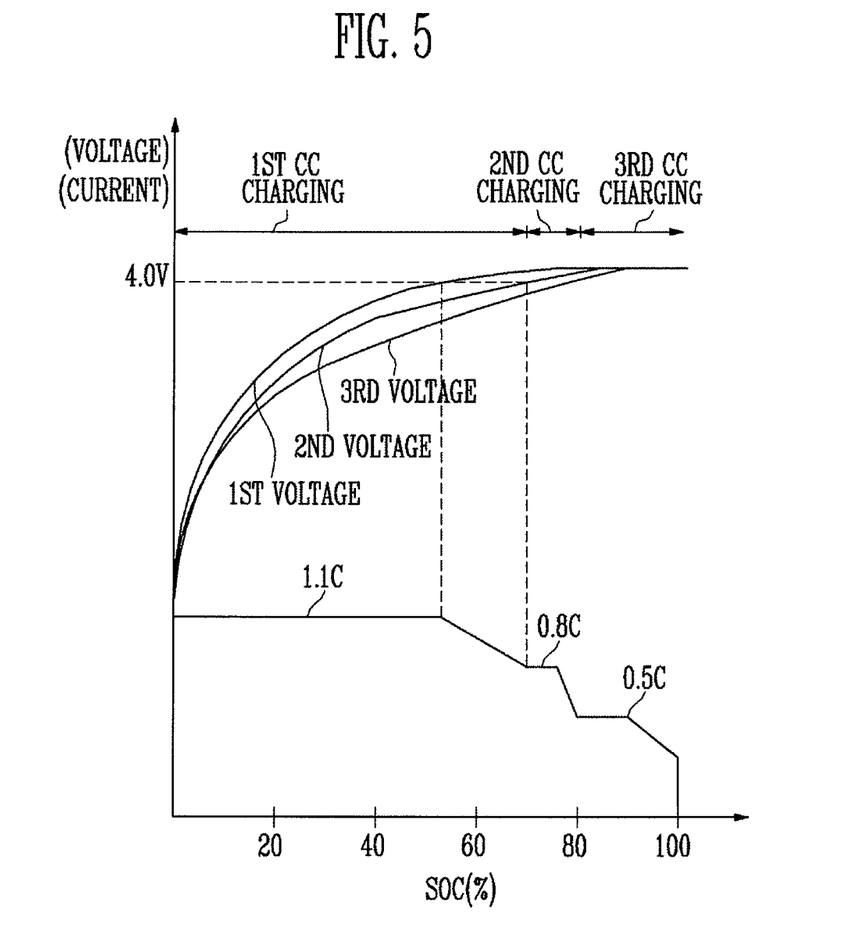
FIG. 5 is a diagram showing a method in which CCCV charging is performed in each SOC section according to an embodiment of the present invention.

FIG. 5 is a diagram showing a method in which CCCV charging is performed in each SOC section according to an embodiment of the present invention.

Referring to FIG. 5, a first CCCV charging section is a section where the SOC is about 0% to about 70%, a second CCCV charging section is a section where the SOC is about 70% to about 80%, and a third CCCV charging section is a section where the SOC is about 80% to about 100%.

In FIG. 5, a first voltage curve represents a change in voltage when the battery is charged at about 1.1 C, a second voltage curve represents a change in voltage when the battery is charged at about 0.8 C, and a third voltage curve represents a change in voltage when the battery is charged at about 0.5 C.

Referring to FIG. 5, the first CCCV charging section is charged as follows: first, about 1.1 C is supplied to the battery 10 until the voltage of the battery reaches the charge cutoff voltage, so that the CC charging is performed. In this case, the charge cutoff voltage is about 4.0V at which the SOC of the battery in the second voltage curve becomes about 70% that is the final SOC of the first CCCV charging section.

Subsequently, the charge C-rate of about 1.1 C is sequentially reduced to the charge C-rate of about 0.8 C that is set for the second CCCV charging section, so that the CV charging is performed.

The CC charging performed in each SOC section is faster in charging speed than the CCCV charging, but is slightly faster in degradation speed of the battery 10 than the CCCV charging.

Figure 6:
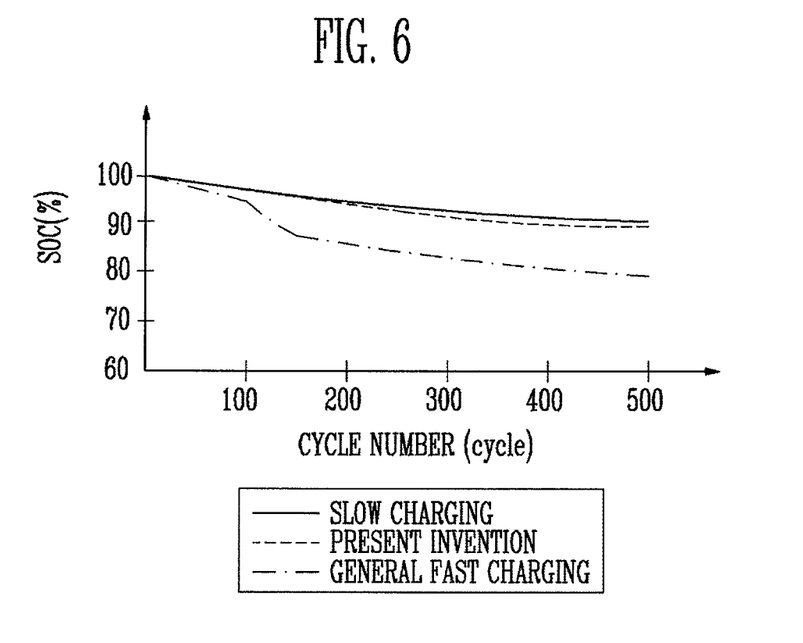
FIG. 6 is a diagram showing a comparison between a capacity recovery rate when slow charging or fast charging is repeated and a capacity recovery rate when the charging method of the present invention is applied.

FIG. 6 is a diagram showing a comparison between a capacity recovery rate when slow charging or fast charging is repeated and a capacity recovery rate when the charging method of the present invention is applied.

Referring to FIG. 6, the slow charging and the charging method of the present invention show similar results: as the number of charging and discharging operations increases, the capacity recovery rate is reduced. However, it may be seen that the capacity recovery rate obtained when fast charging is performed with the charge C-rate greater than that of the slow charging is rapidly reduced as the number of charging and discharging operations exceeds 150 times.

Herein, it is described that the slow charging is similar in capacity recovery rate to the charging method of the present invention. This means that electrochemical properties of the battery are similar in the slow charging and the fast charging using the present invention. Further, it may be seen that it is possible to use the battery for a lengthy period of time as in slow charging, even when fast charging of the present invention is repeated.

Further, in the case of performing the slow charging, it took about 142 minutes to reach the full charge state. Additionally, in the case of the charging method of the present invention, it took about 95 minutes to complete the charging operation. In the case of the fast charging, it took about 98 minutes to complete the charging operation. That is, it may be seen that the charging method of the present invention is similar in charging speed to the comparable fast charging.

Figure 7:
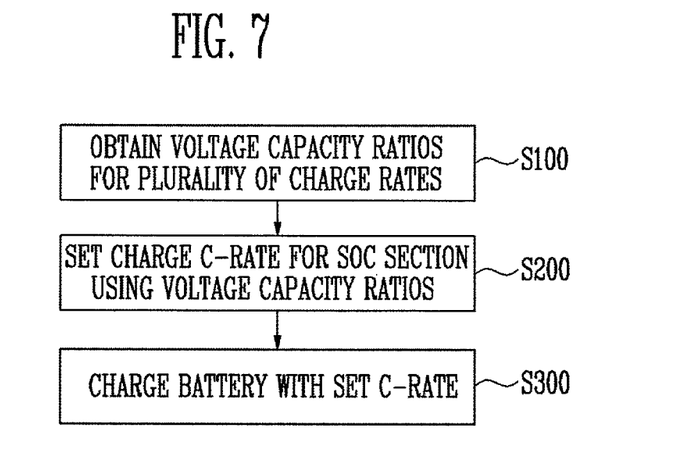
FIG. 7 is a flowchart showing an entire process of a battery charging method according to an embodiment of the present invention.

FIG. 7 is a flowchart showing an entire process of a battery charging method according to an embodiment of the present invention.

First, the voltage capacity ratios are obtained, respectively, for the reference charge C-rate and the N (N is an integer of 1 or more) charge C-rates, which are greater than the reference charge C-rate, at step S100.

Step S100 includes step S100-1 of charging the battery with the reference charge C-rate and then obtaining the voltage capacity ratio for the reference charge C-rate, and step S100-2 of discharging the battery, charging the battery with the first charge C-rate, which is increased by a preset value as compared to the C-rate of the previous charging step, and then obtaining the voltage capacity ratio for the first charge C-rate. Step S100-2 may be repeated N times so as to obtain the voltage capacity ratios for the first to Nth charge C-rates.

Subsequently, the voltage capacity ratio of the reference charge C-rate is compared with the voltage capacity ratio of each of the N charge C-rates, and then the charge C-rate is set, from among the N charge C-rates, such that a difference in voltage capacity ratio for each SOC section is reduced or minimized, at step S200.

In an embodiment, step S200 includes step S200-1 of selecting an SOC section where a difference in voltage capacity ratio between the reference charge C-rate and the Nth charge C-rate is within a preset range, among all the SOC sections of the battery, and then setting the charge C-rate of the selected SOC section to the Nth charge C-rate, and step S200-2 of selecting an SOC section where a difference in voltage capacity ratio between the reference charge C-rate and the (N−1)th charge C-rate is within a preset range, out of the SOC sections of the battery excluding the selected SOC section, and then setting the charge C-rate of the selected SOC section to the (N−1)th charge C-rate. Step S200-2 may be repeated in the same or substantially the same manner for the (N−2)th to the first charge C-rate.

Finally, the battery 10 is charged at the charge C-rate that is set for each SOC section, at step S300.

According to an embodiment of the present invention, when the number of battery charging and discharging operations reaches a preset number, steps S100 to S200 may be performed again so as to reset the charge C-rate for each SOC section.

The reason is because the battery is degraded as the number of charging and discharging operations increases, so that a similarity in voltage capacity ratio between the charge C-rate, which is first set for each SOC section, and the reference charge C-rate may vary.

Example embodiments have been disclosed herein, and although specific terms are employed, they are used and are to be interpreted in a generic and descriptive sense, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various suitable changes in form and details may be made without departing from the spirit and scope of the present invention as set forth in the following claims, and equivalents thereof.

What is claimed is:

1. A battery charging method, comprising:
    obtaining a voltage capacity ratio for a reference charge C-rate and voltage capacity ratios for N (N is an integer of 1 or more) charge C-rates greater than the reference charge C-rate, each of the voltage capacity ratios for the reference charge C-rate and the N charge C-rates being defined as a ratio of a voltage variance to a capacity variance depending on a change in state of charge (SOC) of a battery when the battery is charged at a corresponding one of the C-rates;
    comparing the voltage capacity ratio of the reference charge C-rate with each of the voltage capacity ratios of the N charge C-rates, and then setting a charge C-rate of the N charge C-rates so that a difference in voltage capacity ratio is minimized for each of SOC sections; and
    charging the battery with the charge C-rates corresponding to the SOC sections.

2. The battery charging method of claim 1, wherein the obtaining the voltage capacity ratios comprises:
    charging the battery with the reference charge C-rate, and then obtaining the voltage capacity ratio for the reference charge C-rate; and
    discharging the battery and then charging the battery with a first charge C-rate greater than the C-rate of a previous charging act by a preset value, thus obtaining a corresponding one of the voltage capacity ratios for the first charge C-rate, wherein the discharging and then charging of the battery is repeated N times so as to obtain the voltage capacity ratios for the first charge C-rate to an Nth charge C-rate.

3. The battery charging method of claim 2, wherein the discharging of battery is performed by constant current-constant voltage (CCCV) discharging.

4. The battery charging method of claim 2, wherein the comparing the voltage capacity ratio comprises:
selecting an SOC section in which a difference in voltage capacity ratio between the reference charge C-rate and the Nth charge C-rate is within a preset range, for all SOC sections of the battery, and then setting a charge C-rate of the selected SOC section to the Nth charge C-rate; and
selecting an SOC section in which a difference in voltage capacity ratio between the reference charge C-rate and an (N−1)th charge C-rate is within a preset range, for SOC sections other than the selected SOC section, and then setting a charge C-rate of the selected SOC section to the (N−1)th charge C-rate,
wherein selecting the SOC section is repeatedly performed for an (N−2)th charge C-rate to the first charge C-rate in substantially a same manner.

5. The battery charging method of claim 4, wherein a charge C-rate of a section of the SOC sections in which any one of the N charge C-rates is not set, is set to the reference charge C-rate.

6. The battery charging method of claim 1, wherein, during the charging the battery, constant current (CC) charging or constant current-constant voltage (CCCV) charging is performed in each of the SOC sections using a corresponding one of the charge C-rates.

7. The battery charging method of claim 6, wherein, when the battery charging is performed by the CC charging, a first SOC section of the SOC sections is supplied with a corresponding one of the charge C-rates and then is charged until a voltage of the battery reaches a charge cutoff voltage set for the first SOC section.

8. The battery charging method of claim 7, wherein, when the battery is charged at the charge C-rate corresponding to the first SOC section, a charge cutoff voltage set for the first SOC section is a voltage at which the SOC of the battery becomes a final SOC of the first SOC section.

9. The battery charging method of claim 6, wherein, when the battery charging is performed by the CCCV charging,
a first SOC section of the SOC sections undergoes the CC charging by supplying the corresponding one of the charge C-rates until the voltage of the battery becomes a charge cutoff voltage set for the first SOC section, and undergoes constant voltage (CV) charging by supplying a charge C-rate that is sequentially reduced until the SOC of the battery becomes a final SOC of the first SOC section.

10. The battery charging method of claim 9, wherein the charge cutoff voltage set for the first SOC section is a voltage at which the SOC of the battery becomes the final SOC of the first SOC section, when the battery is charged at a C-rate set for a second SOC section that is a section subsequent to the first SOC section.

11. The battery charging method of claim 9, wherein the charge C-rate that is sequentially reduced is reduced to the charge C-rate set for the SOC section that is subsequent to the first SOC section.

12. The battery charging method of claim 1, wherein, when a number of battery charging and discharging operations reaches a preset number, the obtaining the voltage capacity ratios and comparing the voltage capacity ratio are performed again to reset the charge C-rates corresponding to the SOC sections.

13. A battery management system, comprising:
a voltage-capacity-ratio acquisition unit configured to obtain a voltage capacity ratio for a reference charge C-rate and voltage capacity ratios for N (N is an integer of 1 or more) charge C-rates greater than the reference charge C-rate, each of the voltage capacity ratios for the reference charge C-rate and the N charge C-rates being defined as a ratio of a voltage variance to a capacity variance depending on a change in SOC of a battery when the battery is charged at a corresponding one of the C-rates;
a charge-current setting unit configured to compare the voltage capacity ratio of the reference charge C-rate with each of the voltage capacity ratios of the N charge C-rates, and then setting a charge C-rate of the N charge C-rates so that a difference in voltage capacity ratio is minimized for each of SOC sections; and
a micro control unit (MCU) configured to control charging of the battery such that the battery is charged at the charge C-rates corresponding to the SOC sections.

14. The battery management system of claim 13, further comprising:
a sensing unit configured to sense a voltage and a current of the battery,
wherein the voltage-capacity-ratio acquisition unit obtains a corresponding one of the voltage capacity ratios of any one of the charge C-rates using the voltage and the current that are sensed by the sensing unit, when the battery is charged using any one of the reference charge C-rate and the N charge C-rates.

15. The battery management system of claim 13, wherein the MCU is configured to perform CC charging or CCCV charging for each of the SOC sections, using a corresponding one of the charge C-rates.

16. The battery management system of claim 15, wherein, when the battery charging is performed by the CC charging, a first SOC section of the SOC sections undergoes the CC charging by supplying a corresponding one of the charge C-rates until a voltage of the battery becomes a charge cutoff voltage set for the first SOC section.

17. The battery management system of claim 16, wherein, when the battery is charged at the charge C-rate corresponding to the first SOC section, the charge cutoff voltage set for the first SOC section is a voltage at which the SOC of the battery becomes a final SOC of the first SOC section.

18. The battery management system of claim 15, wherein, when the battery charging is performed by the CCCV charging,
a first SOC section of the SOC sections undergoes the CC charging by supplying the corresponding one of the charge C-rates until the voltage of the battery becomes a charge cutoff voltage set for the first SOC section, and undergoes the CV charging by supplying the charge C-rate that is sequentially reduced until the SOC of the battery becomes a final SOC of the first SOC section.

19. The battery management system of claim 18, wherein the charge cutoff voltage set for the first SOC section is a voltage at which the SOC of the battery becomes the final SOC of the first SOC section, when the battery is charged at a C-rate set for a second SOC section that is a section subsequent to the first SOC section.

20. The battery management system of claim 13, wherein the charge C-rate that is reduced, is reduced to the charge C-rate set for the SOC section that is subsequent to a first SOC section of the SOC sections.

\* \* \* \* \*